(12) United States Patent
Kuo et al.

(10) Patent No.: US 9,189,074 B2
(45) Date of Patent: Nov. 17, 2015

(54) OPTICAL SENSOR SYSTEM

(71) Applicant: Capella Microsystems (Taiwan), Inc., New Taipei (TW)

(72) Inventors: Jinn-Ann Kuo, Taipei (TW); Yu-Hao Kao, New Taipei (TW); Koon-Wing Tsang, Fremont, CA (US); Yuh-Min Lin, San Ramon, CA (US); Cheng-Chung Shih, Fremont, CA (US); Yao-Tsung Tsai, San Jose, CA (US)

(73) Assignee: CAPELLA MICROSYSTEMS (TAIWAN), INC., New Taipei (TW)

( * ) Notice: Subject to any disclaimer, the term of this patent is extended or adjusted under 35 U.S.C. 154(b) by 108 days.

(21) Appl. No.: 14/029,396

(22) Filed: Sep. 17, 2013

(65) Prior Publication Data

US 2014/0246592 A1 Sep. 4, 2014

Related U.S. Application Data

(60) Provisional application No. 61/771,424, filed on Mar. 1, 2013.

(51) Int. Cl.
*G06F 3/01* (2006.01)
*G01S 17/02* (2006.01)
*G01S 17/50* (2006.01)

(52) U.S. Cl.
CPC ............... *G06F 3/017* (2013.01); *G01S 17/026* (2013.01); *G01S 17/50* (2013.01)

(58) Field of Classification Search
CPC ... G01J 1/4228; G06F 3/017; G06K 9/00335; G01S 17/026; G01S 17/50
See application file for complete search history.

(56) References Cited

U.S. PATENT DOCUMENTS

| 5,900,863 | A | * | 5/1999 | Numazaki | 345/158 |
| 2008/0167834 | A1 | * | 7/2008 | Herz et al. | 702/150 |
| 2010/0245289 | A1 | * | 9/2010 | Svajda | 345/175 |
| 2011/0090482 | A1 | * | 4/2011 | Shih et al. | 356/4.06 |
| 2011/0248151 | A1 | * | 10/2011 | Holcombe et al. | 250/221 |
| 2012/0280904 | A1 | * | 11/2012 | Skurnik et al. | 345/156 |

* cited by examiner

*Primary Examiner* — David Porta
*Assistant Examiner* — Mindy Vu
(74) *Attorney, Agent, or Firm* — Muncy, Geissler, Olds & Lowe P.C.

(57) ABSTRACT

An optical sensor system is disclosed. The optical sensor system comprises a panel and a sensing unit. The panel comprises a plurality of transparent areas. The sensing unit locates at one side of the panel and the sensing unit senses a plurality of first light signals reflected by an object and senses a plurality second light signals of an ambient light. The reflected first light signals and the second light signals pass through one of the plurality of transparent areas of the panel. The sensing unit further comprises a light sensor and a plurality of gesture sensors. The light sensor locates at the center of the sensing unit, and the light sensor senses the second light signals. The plurality of gesture sensors surrounds the light sensor, and the gesture sensors senses the reflected first light signals and then produce gesture signals corresponding to motions of the object.

14 Claims, 16 Drawing Sheets

OPTICAL SENSOR SYSTEM

CROSS-REFERENCE TO RELATED APPLICATION

This application claims the benefit of U.S. Provisional Patent Application No. 61/771,424, filed on Mar. 1, 2013, in the United States Patent and Trademark Office, the disclosure of which is incorporated herein in its entirety by reference.

BACKGROUND OF THE INVENTION

1. Field of the Invention

The exemplary embodiment(s) of the present invention relates to a sensor system. More specifically, the exemplary embodiment(s) of the present invention relates to an optical sensor system.

2. Description of Related Art

In recent years, the LED technology has big progress in the brightness efficiency, and many applications for displays continuously appear. Also, the optical proximity sensor (OPS) apparatus is commonly used in wireless communications, bio-molecular sciences, environmental monitoring, and displays. The OPS apparatus is developed based on the light signal received by the photo-diode (PD) via the reflections of the measured object. The PD transfers the light signal to the electrical signal. By detecting the intensity of the electrical signal, the OPS apparatus can obtain the direction of movement of the measured object.

For example, a traditional OPS system, such as a quadrant photodiode system, may be used to determine whether an object is moved from one direction to the other direction above the display of an electronic device, and then the electronic device can determine the moving direction for position or motion sensing. However, in such a case, the quadrant photodiode system needs some sort of focusing lens or light projection system to project image onto the quadrant detectors of the quadrant photodiode system, and the quadrant photodiode cells in the quadrant photodiodes need to be located adjacent to each other. Because the optical focusing lens is needed, the light detection viewing angle would be dramatically reduced resulting in light brightness and color temperature sensing errors. Besides, packaging with integrated physical focusing lens on sensor will significantly increase the overall package thickness over 2 mm, thereby making the quadrant photodiode system difficult to be applied in mobile device applications. Moreover, continuous sampling at a very high speed for position or motion sensing is necessary in the quadrant photodiode system, therefore increasing power consumption. The phenomenon mentioned above is an unwanted drawback for all the users.

Thus, for the demand, designing an optical sensor system to increase the accuracy of detecting the position or motion of the object and to decrease the power consumption has become an urgent issue for the application in the market.

SUMMARY OF THE INVENTION

An optical sensor system is disclosed. The optical sensor system comprises a panel and a sensing unit. The panel comprises a plurality of transparent areas. The sensing unit may locate at one side of the panel and the sensing unit may sense a plurality of first light signals reflected by an object and sense a plurality second light signals of an ambient light. The reflected first light signals and the second light signals may pass through one of the plurality of transparent areas of the panel. The sensing unit may further comprise a light sensor and a plurality of gesture sensors. The light sensor may locate at the center of the sensing unit, and the light sensor may sense the second light signals. The plurality of gesture sensors may surround the light sensor, and the gesture sensors may sense the reflected first light signals and then produce gesture signals corresponding to motions of the object.

Preferably, the optical sensor system may further include a processing unit having an activate threshold (A_THD), and the processing unit may trigger a gesture signal calculation if the reflected first light signals sensing by the sensing unit is larger than the A_THD.

Preferably, the plurality of gesture sensors may comprise an up PD (UPD) and a down PD (DPD) being separately configured to surround the light sensor peripherally.

Preferably, the plurality of gesture sensors may comprise a left PD (LPD) and a right PD (RPD) being separately configured to surround the light sensor peripherally.

Preferably, when the gesture signal calculation is triggered by a processing unit, the processing unit may further determine the direction of gesture according to the following equations: $f(y)=(V_{UPD}-V_{DPD})/(V_{UPD}+V_{DPD})$; wherein $V_{UPD}$ and $V_{DPD}$ are voltage signals generated by sensing the reflected first light signals by UPD and DPD respectively.

Preferably, when the gesture signal calculation is triggered by a processing unit, the processing unit may further determine the direction of gesture according to the following equations: $f(x)=(V_{LPD}-V_{RPD})/(V_{LPD})+V_{RPD})$, wherein $V_{LPD}$ and $V_{RPD}$ are voltage signals generated by sensing the reflected first light signals by LPD and DPD respectively.

Preferably, the processing unit may further include UPD threshold (U_THD) and DPD threshold (D_THD); wherein when $f(y)<-U\_THD$ and then $f(y)>D\_THD$, the direction of gesture is determined and reported as a first longitudinal direction by the processing unit; and when $f(y)>U\_THD$ and then $f(y)<-D\_THD$, the direction of gesture is determined and reported as a second longitudinal direction by the processing unit.

Preferably, the processing unit may further include LPD threshold (L_THD) and RPD threshold (R_THD); wherein when $f(x)<-L\_THD$ and then $f(x)>R\_THD$, the direction of gesture is determined and reported as a first lateral direction by the processing unit; when $f(x)>L\_THD$ and then $f(x)<-R\ THD$, the direction of gesture is determined and reported as a second lateral direction by the processing unit.

Preferably, the first light signals may be emitted from a light emitting unit located at the same side as the sensing unit of the panel.

Preferably, the light emitting unit may comprise infrared light emitting diodes (IR LEDs).

Preferably, the reflected first light signals may be non-visible light signals.

Preferably, the light sensor may be a single light sensor or a mosaic tile sensor array.

Preferably, the mosaic tile sensor array may include a plurality of light sensor cells selected from the group consisting of red sensor cell, green sensor cell, blue sensor cell, white sensor cell, UV sensor cell and IR sensor cell.

Preferably, the sensing unit may further has a multi-cavity optical filter being stacked thereon, and the multi-cavity optical filter may filter the reflected first light signals and the second light signals passing through one of the plurality of transparent areas.

With the object, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

Exemplary embodiments of the present invention are described herein in the context of an optical sensor system.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as throughout the drawings and the following detailed description to refer to the same or like parts.

Figure 1:
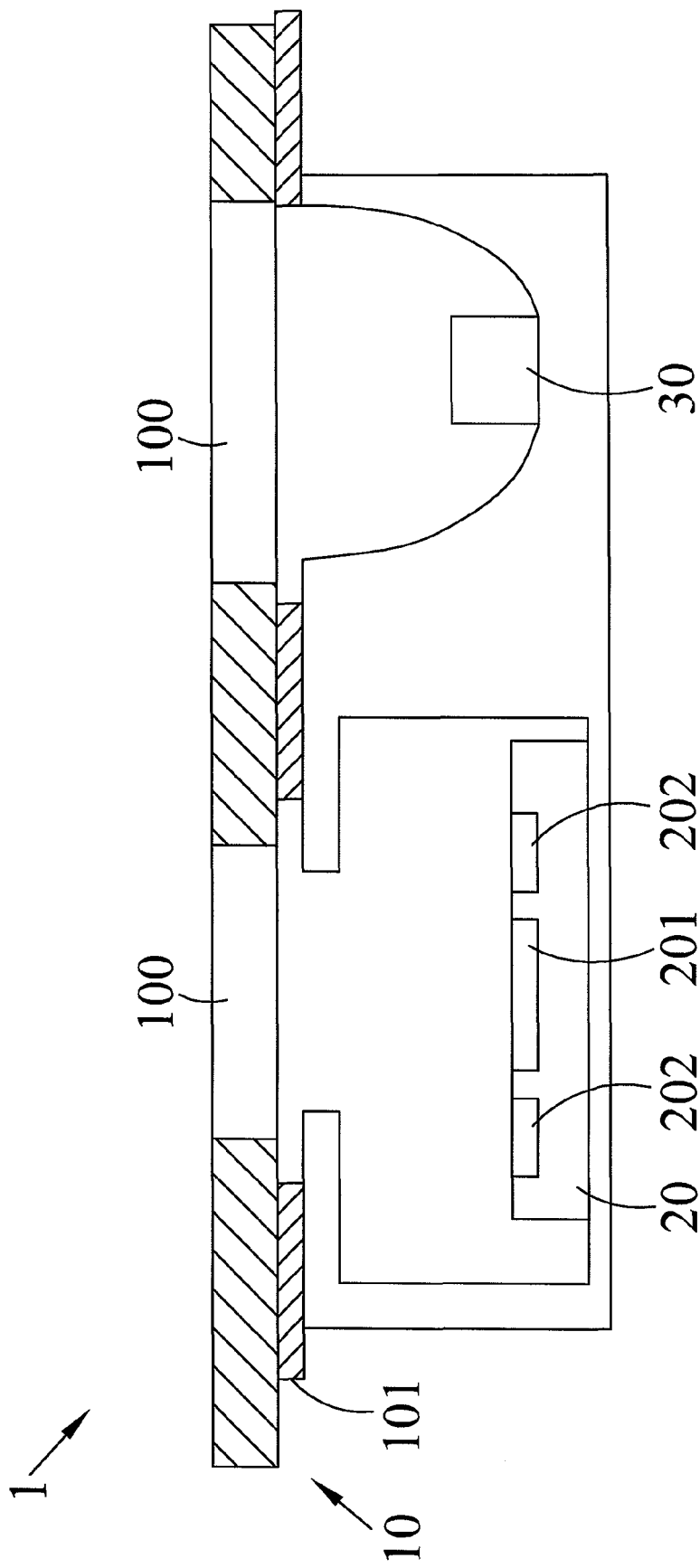
FIG. 1 is a schematic view illustrating a first embodiment of a structure of an optical sensor system according to the present invention.

Please refer to FIG. 1 which is a schematic view illustrating a first embodiment of a structure of an optical sensor system according to the present invention. As shown in the figure, the optical sensor system 1 comprises a panel 10 and a sensing unit 20. The panel 10 comprises a plurality of transparent areas 100. The sensing unit 20 may be located at one side of the panel 10 and the sensing unit 20 may sense a plurality of first light signals reflected by an object and sense a plurality second light signals of an ambient light of the environment. The reflected first light signals and the second light signals may pass through one of the plurality of transparent areas 100 of the panel 10. The sensing unit 20 may further comprise a light sensor 201 and a plurality of gesture sensors 202. The light sensor 201 may be located at the center of the sensing unit 20, and the light sensor 201 may sense the second light signals from the ambient light. The plurality of gesture sensors 202 may surround the light sensor 201, and the gesture sensors 202 may sense the reflected first light signals and then produce gesture signals corresponding to motions of the object. In addition, in the preferable embodiment, the first light signals may be emitted from a light emitting unit 30 located on the panel at the same side as the sensing unit 20. Moreover, the light emitting unit 30 comprises infrared light-emitting diodes (IR LEDs), and the embodiments describing the IR LEDs are only examples without limit to this invention. In addition, the optical sensor system 1 may further comprise a plurality of isolation wall 101 being located between the panel 10 and the sensing unit 20. The isolation wall 101 may be light leakage isolation wall or black tape. Besides, the light emitting unit 30 may further be disposed with a metal gold or aluminum reflector cup for better light source power emission. Also, both the sensing unit 20 and light emitting unit 30 may be encapsulated with silicone compound as a package for the safety and stability.

It is worthy to point out that the optical sensor system 1 may further include a processing unit having an activate threshold (A_THD), and the processing unit may trigger a gesture signal calculation if the reflected first light signals sensing by the sensing unit 20 is larger than the A_THD. The detail features of gesture signal calculation will be described latterly.

Figure 2:
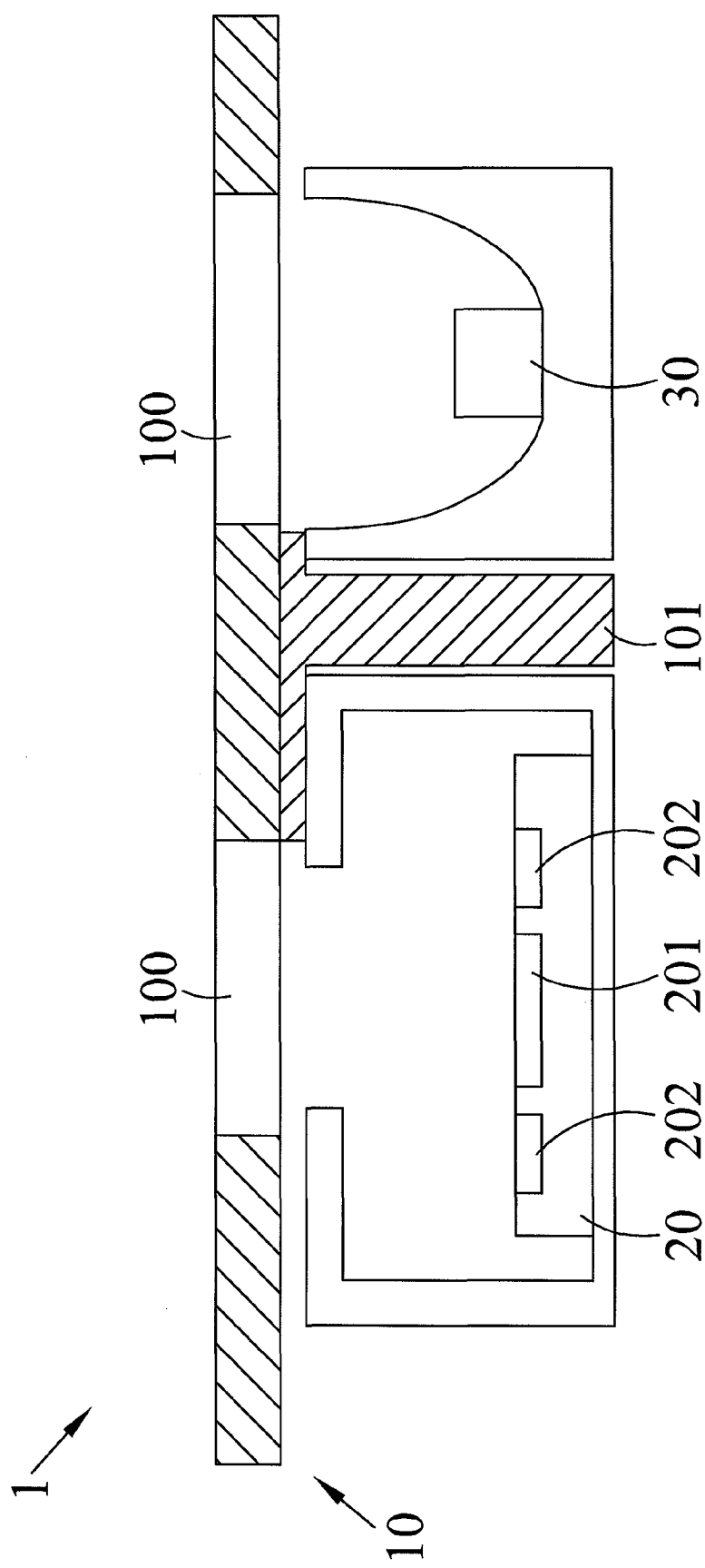
FIG. 2 is a schematic view illustrating a second embodiment of a structure of the optical sensor system according to the present invention.

Please refer to FIG. 2 which is a schematic view illustrating a second embodiment of a structure of the optical sensor system according to the present invention. As shown in the figure, the difference between FIG. 2 and FIG. 1 lays in that the sensing unit 20 and the light emitting unit may be discrete from each other. That is to say, the sensing unit 20 and the light emitting unit 30 may be located adjacently and separated by the isolation wall 101, and the embodiments describing the structural arrangement are only examples without limiting to this invention.

Figure 3:
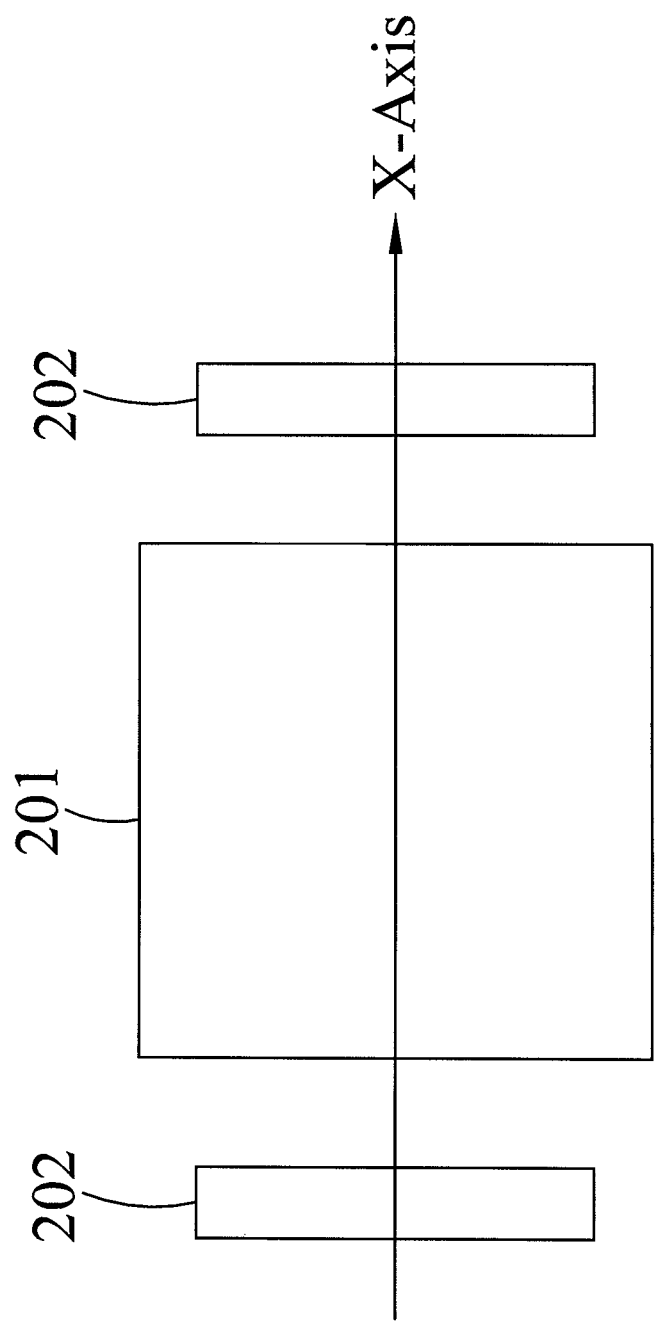
FIG. 3 is a schematic view illustrating a first embodiment of sensing unit of the optical sensor system according to the present invention.

Please refer to FIG. 3 which is a schematic view illustrating the first embodiment of structural arrangement of sensing unit of the optical sensor system according to the present invention. As shown in FIG. 3, the light sensor 201 may be located at the center of the sensing unit 20 and the gesture sensors 202 may be disposed to surround the light sensor 201 along the direction of X-Axis, so as to make the gesture sensors 202 as a left PD (LPD) and a right PD (RPD) respectively. Hence, by this implement, the sensing unit 20 may be capable of sensing the motions of the object substantially moving along the X-Axis.

Figure 4:
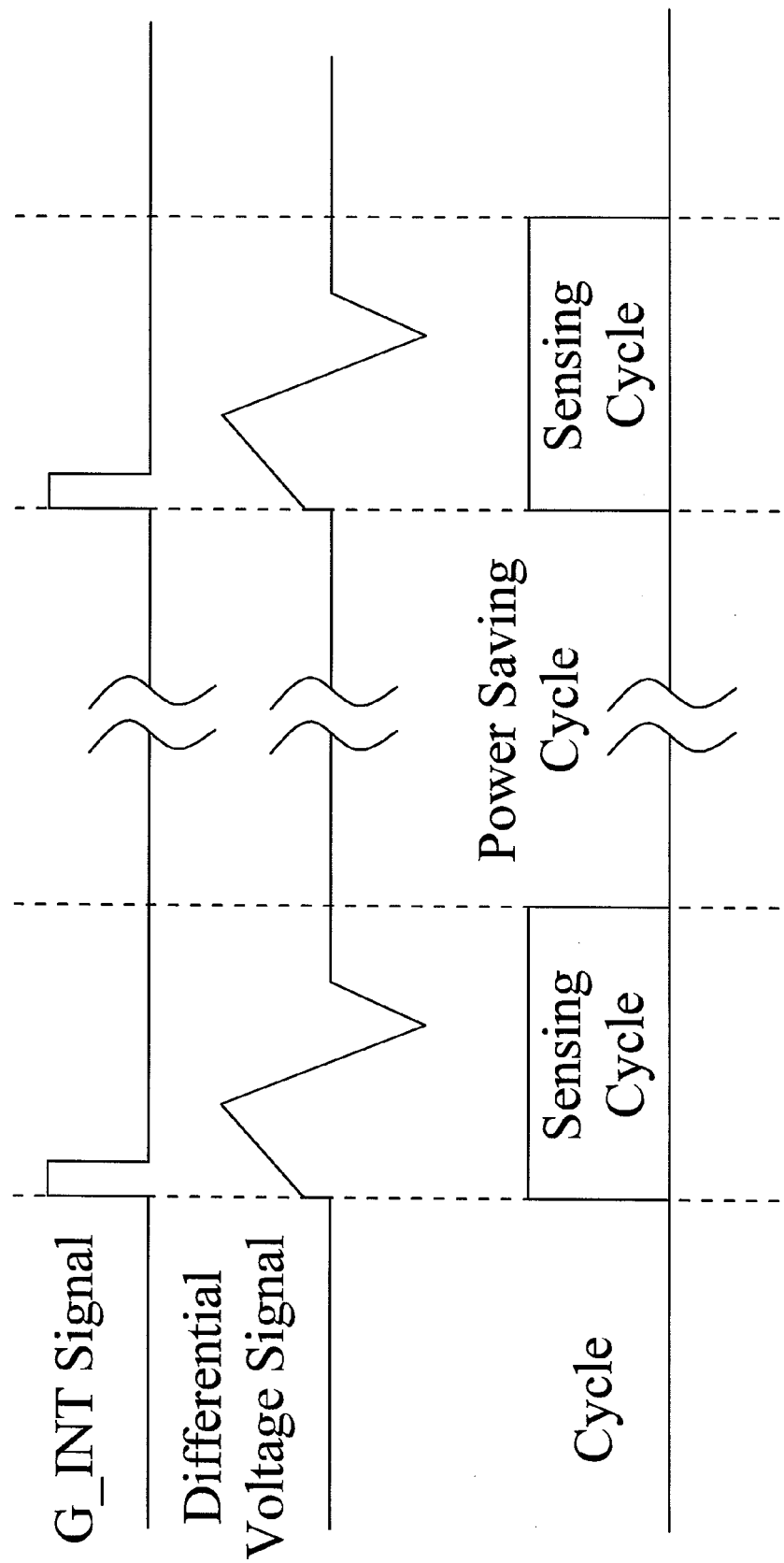
FIG. 4 is the gesture sensing signal diagram of the optical sensor system according to the present invention.

Please refer to FIG. 4 which is a schematic gesture sensing signal diagram of the optical sensor system according to the present invention. As shown in the figure, the gesture interrupt signal (G_INT Signal) is triggered when one of the spatially segmented PDs, such as RPD, LPD etc., receives the reflected first light signal greater than the A_THD. After that, the optical sensor system is operating in the sensing cycle, and the differential voltage signal will be calculated by the processing unit until the motion or gesture of the object is determined. In addition, if there is no triggered G_INT Signal being generated, the optical sensor system is operating in the power saving cycle for decreasing the power consumption. Besides, the sampling rate may be larger than 1 KHz performed by microcontroller unit (MCU) during the sensing cycle. Furthermore, in one embodiment, the gesture interrupt signal (G_INT Signal) may also be triggered when one of the spatially segmented PDs receives the reflected first light signal greater than the A_THD continuously at least 5 times during the sampling process.

Figure 5:
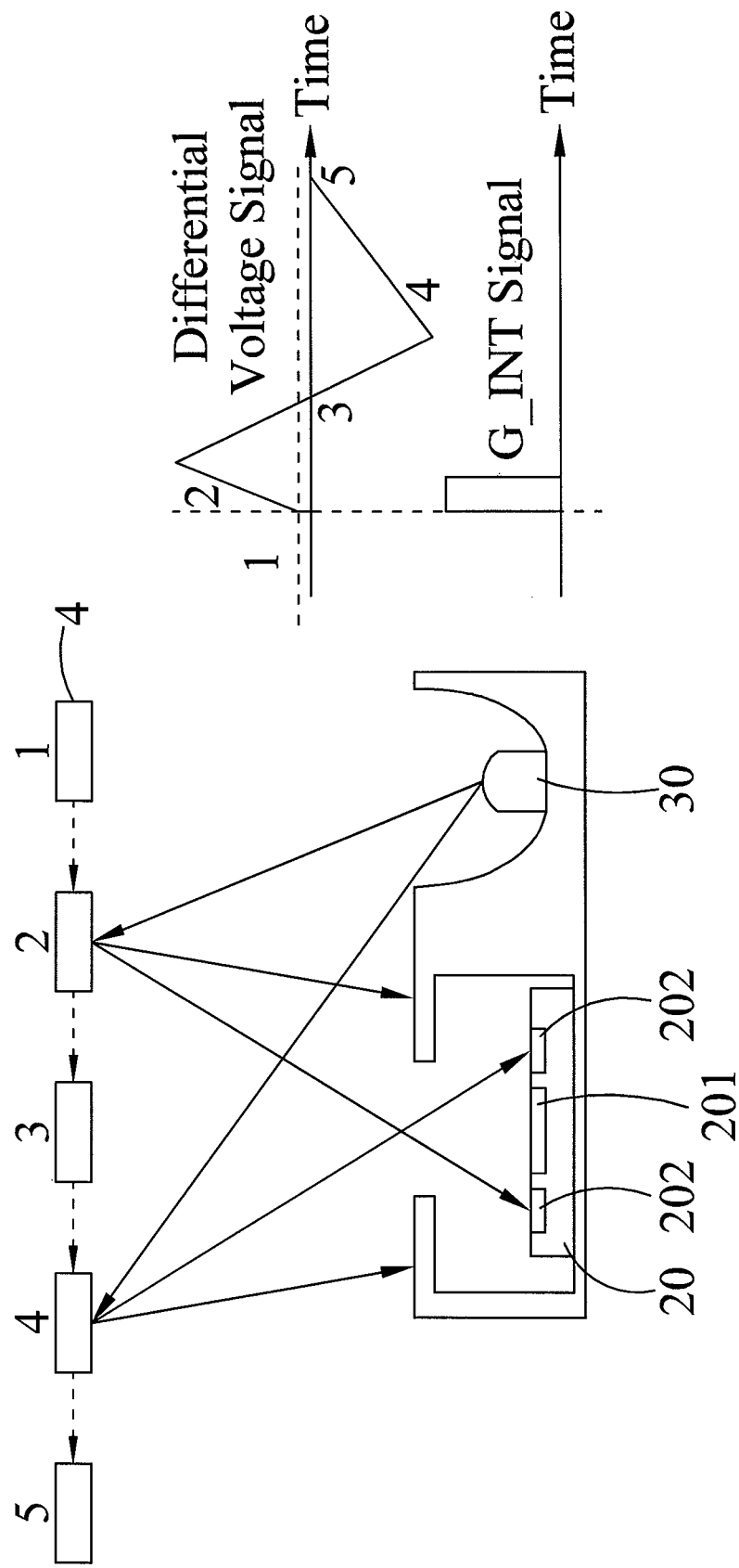
FIG. 5 is a Right-to-Left gesture sensing signal diagram of the optical sensor system according to the present invention.

Please refer to FIG. 5 which is a Right-to Left gesture sensing signal diagram of the optical sensor system according to the present invention. In this embodiment, for simplicity description, the determination of the motions of the object would be illustrated by two gesture sensor 202, such as RPD and LPD as an example, without limiting thereto. As shown in the figure, the Right-to-Left gesture sensing signal diagram of the optical sensor system according to the present invention is provided. The light emitting unit 30 emits a plurality of first light signals. While an object 4 is moved from somewhere along a lateral direction, such as from right to left illustrated by positions 1-5, over the panel, some of the first light signals may be reflected by the object 4 located at the position 2, and pass through the transparent area of the panel. Then, the reflected first light signal passing through the transparent area may be received and sensed by one of the gesture sensors 202, such as the LPD. At the same time, if the reflected first light signal sensed by the LPD is greater than the A_THD of the processing unit, the G_INT signal would be generated and then trigger the processing unit to perform a gesture signal calculation. The detail features of the gesture signal calculation performed by the processing unit will be described latterly. As the object 4 keeps moving, some of the first light signals may be reflected by the object 4 located at the position 4, and pass through the transparent area of the panel. Then, the reflected first light signal passing through the transparent area may be received and sensed by one of the gesture sensors 202, such as the RPD. As the object 4 moves from position 1 to 5, the differential voltage signal between the LDP and RPD may be obtained, which is depicted in FIG. 5, and corresponding positions of the object are also depicted in FIG. 5.

Figure 6:
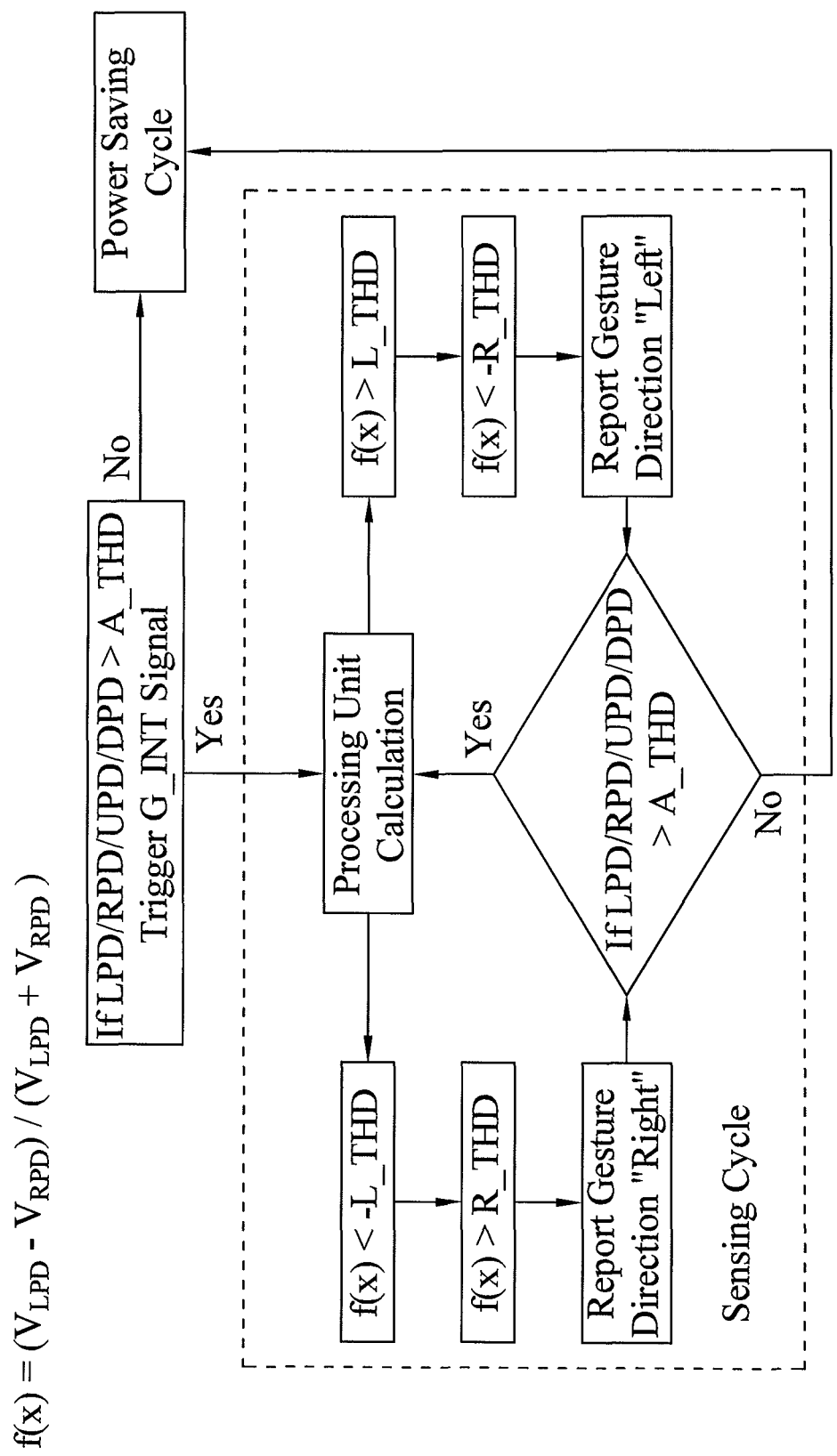
FIG. 6 is gesture sensing flow chart of the optical sensor system according to the present invention.
Figure 7:
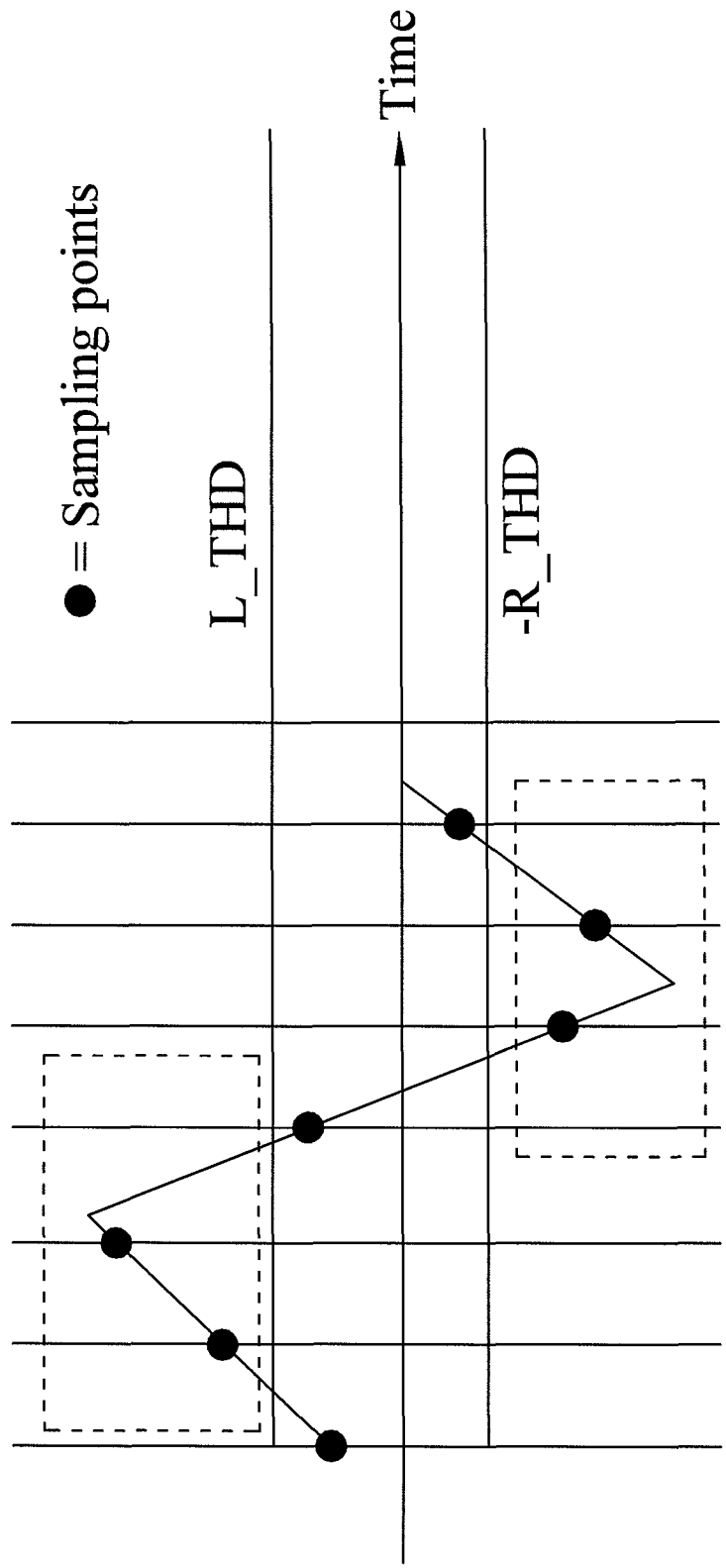
FIG. 7 is a schematic view illustrating an embodiment of sampling signals for detecting motions of an object of the optical sensor system according to the present invention.

Please refer to FIGS. 6 to 7 which are schematic flow chart illustrating an embodiment of the method for detecting motions of an object of the optical sensor system and schematic view illustrating an embodiment of sampling signals for detecting motions of an object of the optical sensor system according to the present invention. As shown in the figures, the processing unit may further include a LPD threshold (L_THD) and a RPD threshold (R_THD). In this embodiment, for the convenience of description, the determination of the motions of the object would be performed by two gesture sensors, such as the RPD and the LPD as an example, without limiting thereto. When the gesture signal calculation is triggered by a processing unit as mentioned before, the processing unit may further determine the direction of the object according to the following equation: $f(x)=(V_{LPD}-V_{RPD})/(V_{LPD}+V_{RPD})$; wherein $V_{LPD}$ and $V_{RPD}$ are voltage signals generated by sensing the reflected first light signals of LPD and DPD respectively. In the case that the object is moving along a lateral direction from right to left, the processing unit will have a calculation and indicate that f(x) is larger than L_THD when the object is moving from position 1 to 2, and then f(x) is smaller than −R_THD when the object is moving from position 4 to 5. As the result, the direction of gesture of the object will be determined and reported as a lateral direction from right to left by the processing unit. Besides, in the case that the object is moving along a lateral direction from Left-to-Right, the processing unit will have a calculation and indicate that f(x) is smaller than −L_THD when the object is moving from position 5 to 4, and then f(x) is larger than R_THD when the object is moving from position 2 to 1. As the result, the direction of gesture of the object will be determined and reported as a lateral direction from left to right by the processing unit. FIG. 7 shows the detected signal pattern when the object is moving from right to left. In particular, solid black dots in FIG. 7 represents the sampling points during the sensing procedure, wherein the sampling points being located in the range which exceeds the predetermined thresholds, such as L_THD or −R_THD will be considered as effective sampling points, and then those effective sampling point will be further calculated by the processing unit so as to determine the moving direction of the object.

Figure 8:
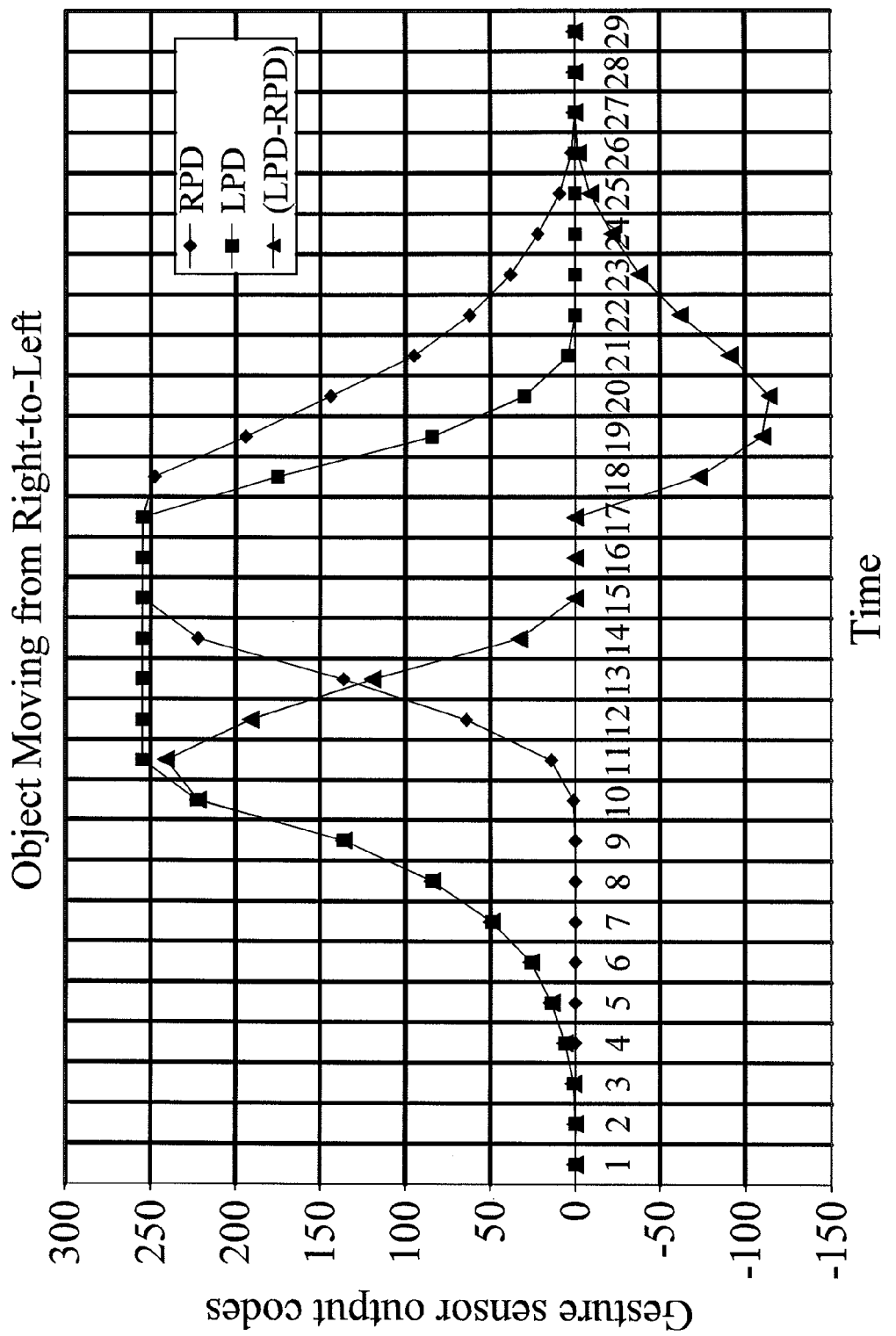
FIG. 8 is a schematic diagram shown the gesture sensing data of moving object from Right-to-Left.
Figure 9:
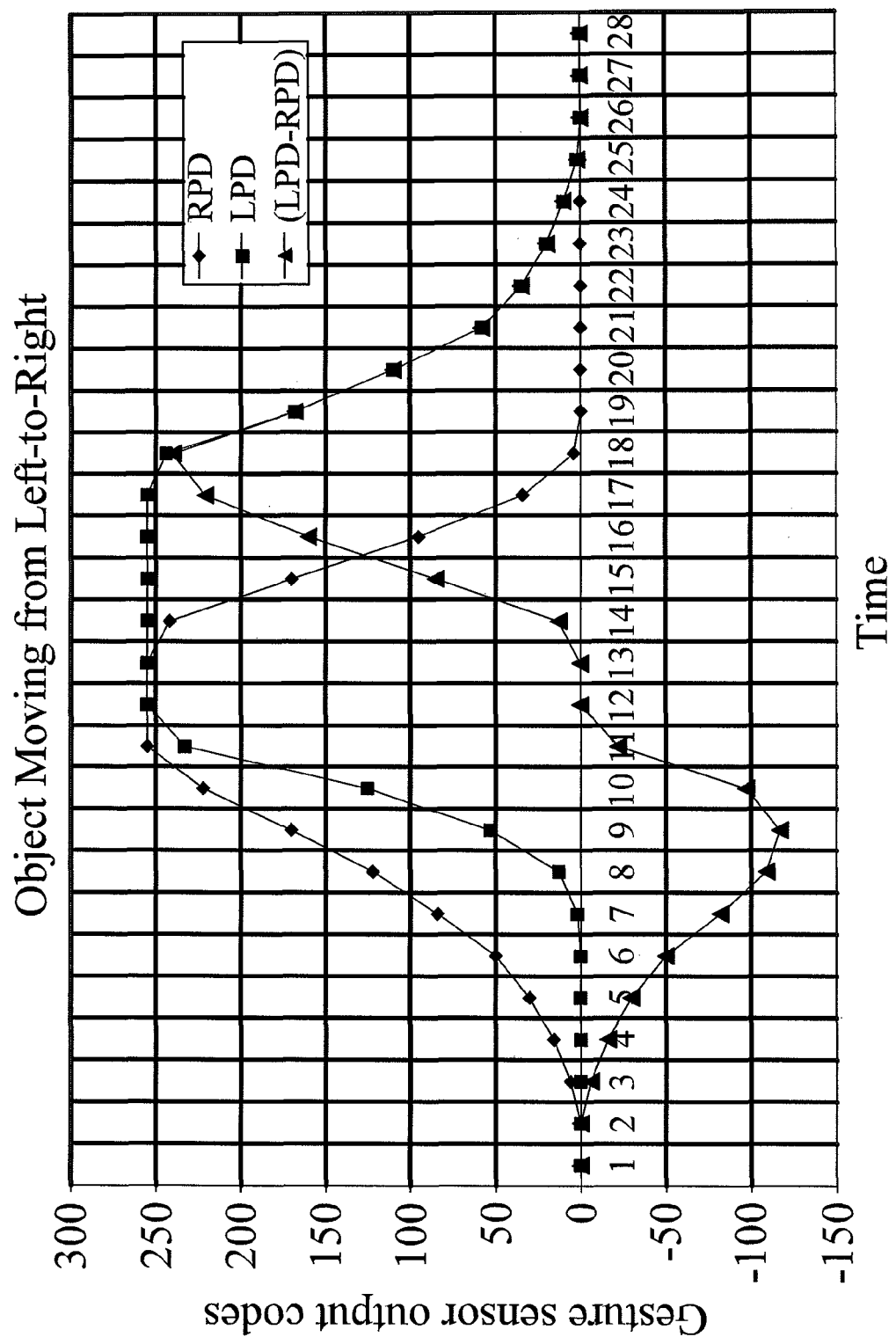
FIG. 9 is a schematic diagram shown the gesture sensing data of moving object from Left-to-Right.

Please refer to FIGS. 8 and 9 which are schematic diagrams showing the gesture sensing data of moving object from Right-to-Left and from Left-to-Right. As shown in FIG. 8, the solid rhombus represents the detected signal of RPD, the solid square represents the detected signal of LPD and the solid triangle represents the differential signal of LPD-RPD. When the object is moving along the direction from Right-to-Left, the detected signals of LPD will be increased rapidly in the beginning (t=4), and then the detected signals of RPD will be increased subsequently (t=11). After that, the detected signals of LPD will be decreased at t=17, and then the detected signals of RPD will be decreased subsequently at t=18. By the equation described above, the differential signal of LPD-RPD will be patterned as shown in FIG. 8. Accordingly, FIG. 9 shows the gesture sensing data of moving object from Left-to-Right with the same or similar concept aforementioned.

Figure 10:
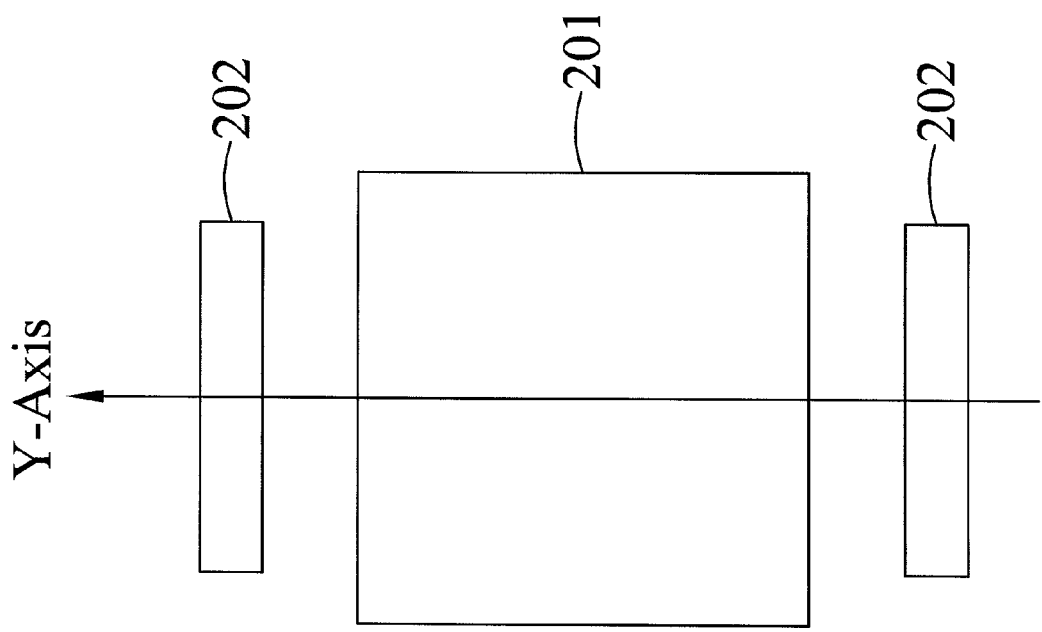
FIG. 10 is a schematic view illustrating a second embodiment of sensing unit of the optical sensor system according to the present invention.
Figure 11:
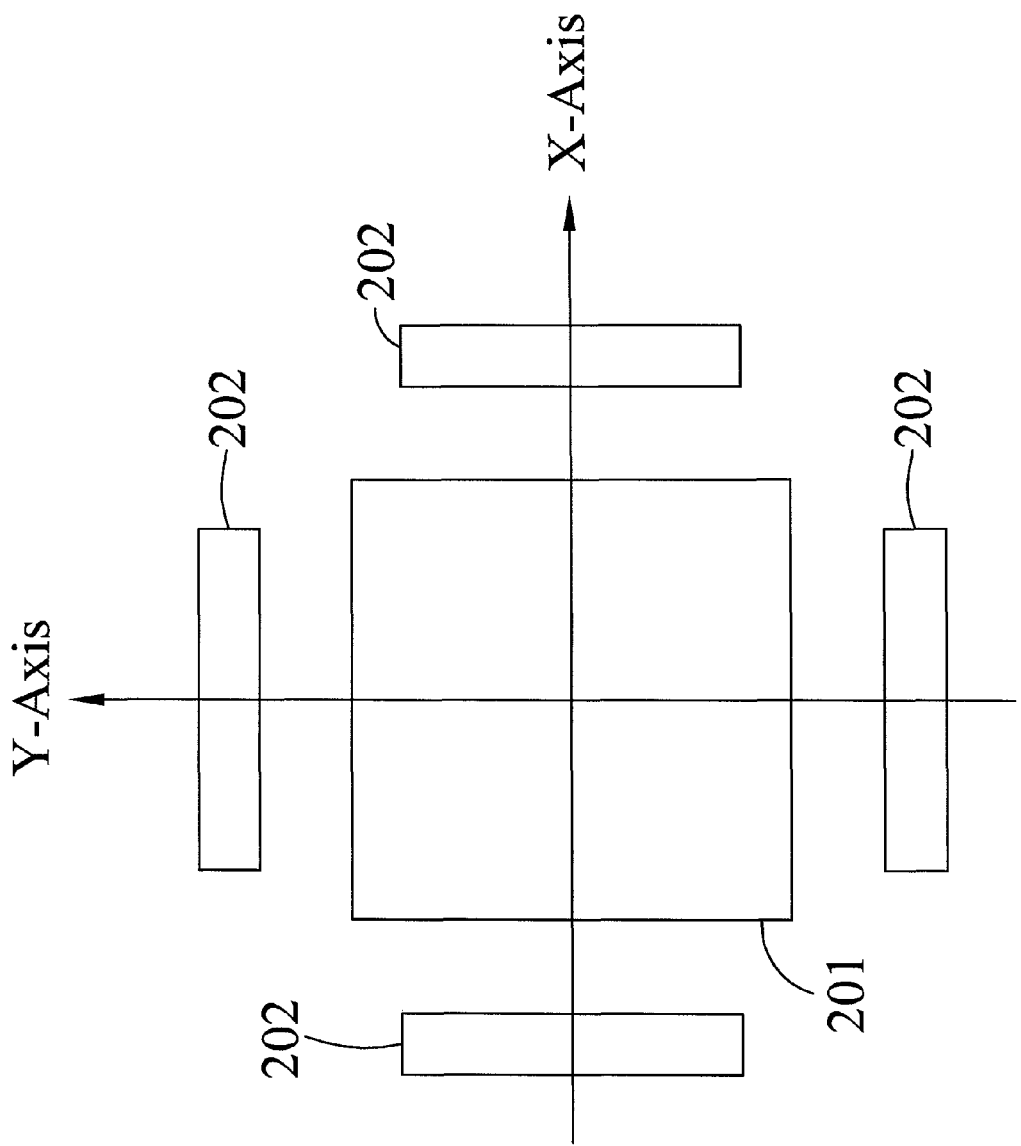
FIG. 11 is a schematic view illustrating a third embodiment of sensing unit of the optical sensor system according to the present invention.
Figure 12:
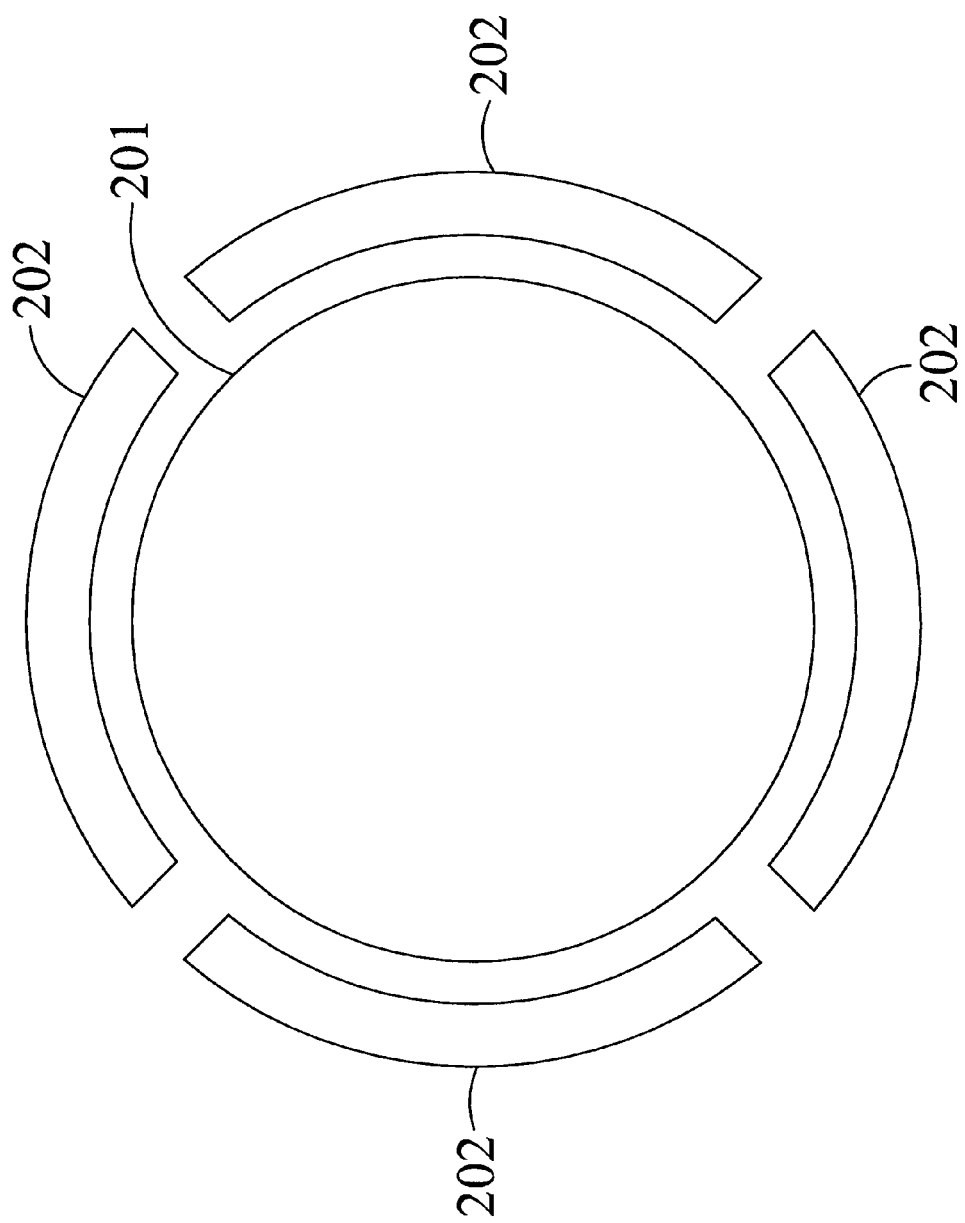
FIG. 12 is a schematic view illustrating a fourth embodiment of sensing unit of the optical sensor system according to the present invention.

Please refer FIGS. 10 to 12 which are schematic views illustrating the second to fourth embodiments of sensing unit of the optical sensor system according to the present invention. As shown in the FIG. 10, the light sensor 201 may be located at the center of the sensing unit 20 and the gesture sensors 202 may be disposed to surround the light sensor 201 along the direction of Y-Axis, so as to make the gesture sensors 202 as an up PD (UPD) and a down PD (DPD) respectively. Hence, by this arrangement, the sensing unit 20 may be capable of sensing the motions of the object substantially moving along the Y-Axis. Furthermore, the processing unit may include UPD threshold (U_THD) and DPD threshold (D_THD). Also, in the case of using UPD and DPD, the processing unit may further determine the direction of the object according to the following equations: $f(y)=(V_{UPD}-V_{DPD})/(V_{UPD}+V_{DPD})$; wherein $V_{UPD}$ and $V_{DPD}$ are voltage signals generated by sensing the reflected first light signals by UPD and DPD respectively. In same concept as using RPD and LPD described above, when f(y)<−U_THD and then f(y)>D_THD, the direction of gesture is determined and reported as a first longitudinal direction by the processing unit; and when f(y)>U_THD and then f(y)<−D_THD, the direction of gesture is determined and reported as a second longitudinal direction by the processing unit. It is worthy to note that the embodiments describing the structural arrangement of the gesture sensor 202 are only examples, without limiting thereto.

As shown in the FIG. 11, the light sensor 201 may be located at the center of the sensing unit 20 and the gesture sensors 202 may be disposed to surround the light sensor 201 along the direction of Y-Axis and X-Axis, so as to make the gesture sensors 202 as the UPD, DPD, LPD and RPD respectively. Hence, the sensing unit 20 may be capable of sensing the motions of the object substantially moving along the Y-Axis and X-Axis. Furthermore, the processing unit may include L_THD, R_THD, U_THD and D_THD. Thus, the processing unit may further determine the direction of the object according to the following equations: $f(x)=(V_{LPD}-V_{RPD})/(V_{LPD}+V_{RPD})$ and $f(y)=(V_{UPD}-V_{DPD})/(V_{UPD}+V_{DPD})$, and both equations will be adapted and calculated in a linear correlation, so as to determine the direction of the motions of the object. In this case, when a specific kind of condition is met, the direction of gesture is determined and reported as which direction by the processing unit. It is worthy to note that the embodiments describing the structural arrangement of the gesture sensors 202 are only examples, without limiting thereto.

As shown in the FIG. 12, the light sensor 201 may be located at the center of the sensing unit 20 and the light sensor 201 may have a round shape. As the result, the gesture sensors 202 may be disposed to surround the light sensor 201 and have a substantially quarter of annular shape, so as to make the gesture sensors 202 as the UPD, DPD, LPD and RPD respectively. Besides, the processing unit may include L_THD, R_THD, U_THD and D_THD. Thus, the processing unit may further determine the direction of gesture of the motions of the object according to the following equations: $f(x)=(V_{LPD}-V_{RPD})/(V_{LPD}+V_{RPD})$ and $f(y)=(V_{UPD}-V_{DPD})/(V_{UPD}+V_{DPD})$, and both equations will be adapted and calculated in a linear correlation, so as to determine the direction of the motions of the object. In this case, when a specific kind of condition is met, the direction of gesture is determined and reported as which direction by the processing unit. It is worthy to note that the embodiments describing the structural arrangement of the gesture sensors 202 are only examples, without limiting thereto. Also, please refer FIG. 13, which is schematic diagram shown the gesture sensing data using LPD, RPD, UPD and DPD at the same time.

Figure 13:
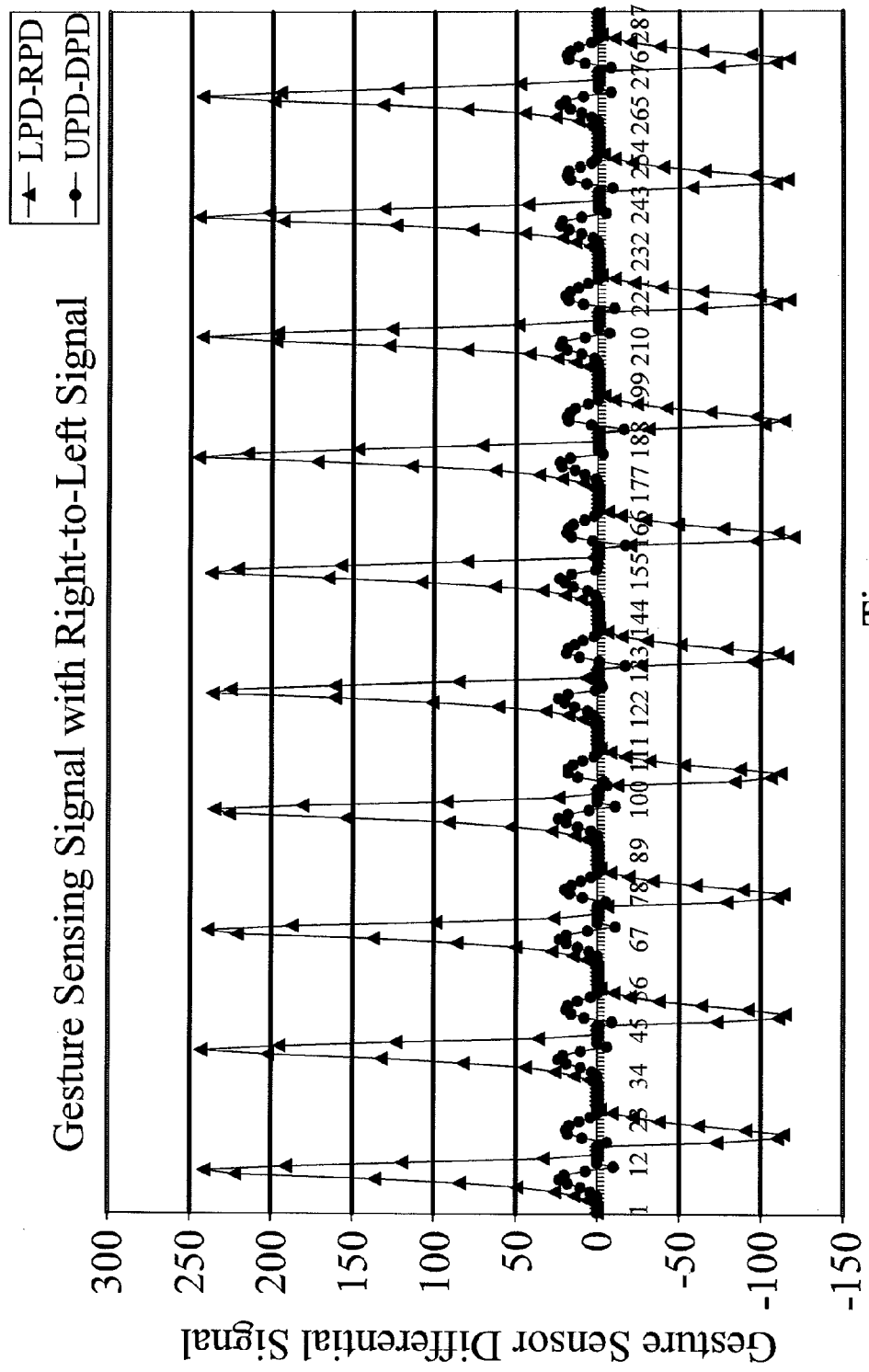
FIG. 13 is a schematic diagram shown the gesture sensing data using LPD, RPD, UPD and DPD at the same time.

As shown in the FIG. 13, the motion direction of the object is determined by the differential signal levels, and it is obvious that the LPD-RPD signal is mush larger than UPD-DPD. That is to say, the signals detected by the LPD and RPD are much larger than that of the UPD and DPD. Hence, the object should be moving from the direction of right to left or left to right mainly as well as the lateral direction. Furthermore, according to the detected signal pattern described in the FIG. 8 or 9, the motion direction of the object moving from Right-to-left in the instant embodiment could be obtained.

Figure 14:
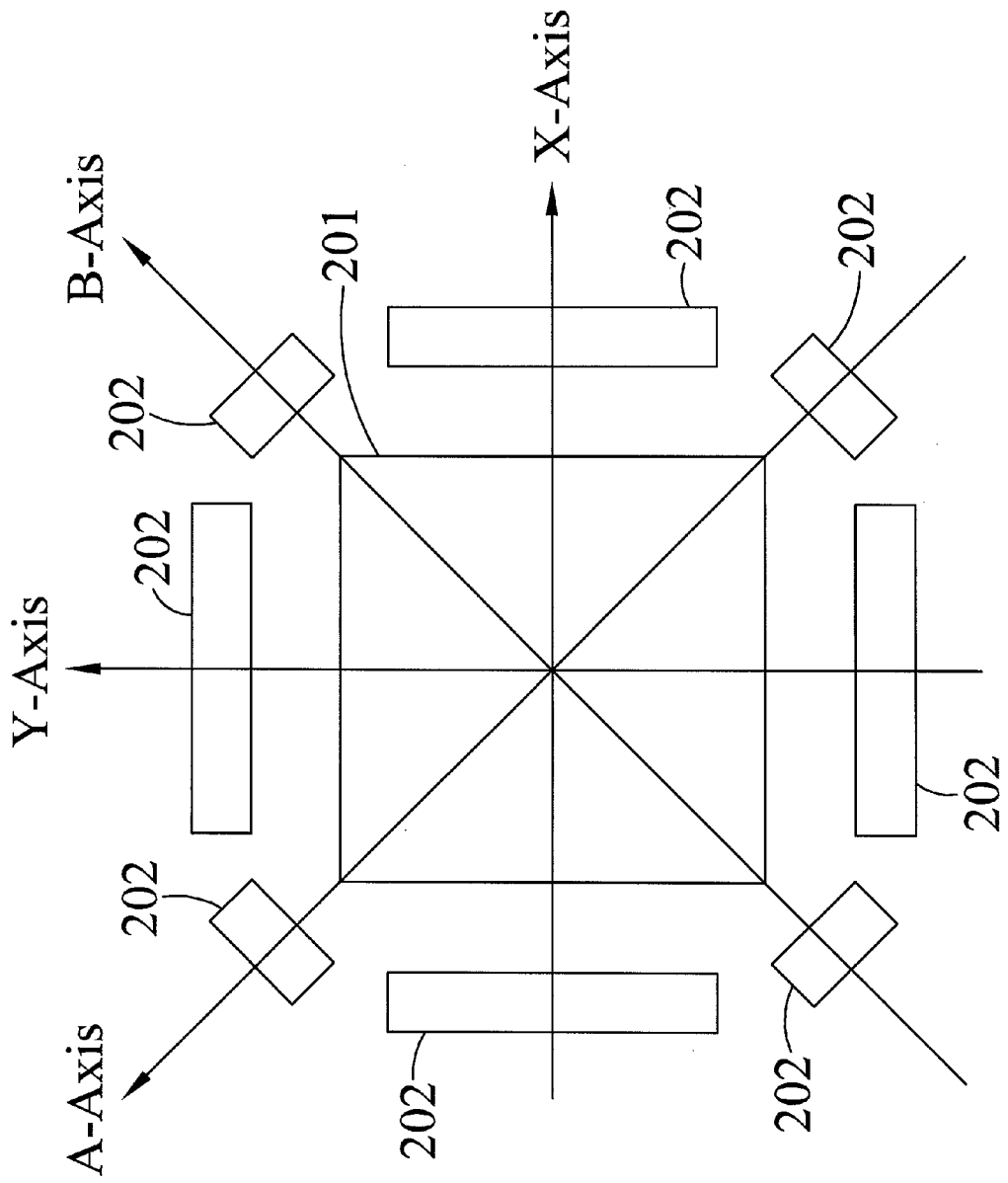
FIG. 14 is a schematic view illustrating a fifth embodiment of sensing unit of the optical sensor system according to the present invention.

Please refer FIG. 14, which is schematic view illustrating a fifth embodiment of sensing unit of the optical sensor system according to the present invention. As shown in FIG. 14, the light sensor 201 may be located at the center of the sensing unit 20 and the gesture sensors 202 may be disposed to surround the light sensor 201 along the direction of Y-Axis and X-Axis, so as to make the gesture sensors 202 as the UPD, DPD, LPD and RPD respectively. Also, the auxiliary gesture sensors 202 may be further disposed near the UPD, DPD, LPD and RPD along the direction of A-Axis and B-Axis. Hence, the sensing unit 20 may be capable of sensing the motions of the object substantially moving along the Y-Axis, X-Axis, A-Axis and B-Axis. As the result, the sensing resolution and accuracy would be dramatically increased. Besides, the processing unit may include L_THD, R_THD, U_THD, D_THD, UR_THD, DR_THD, UL_THD and DL_THD. Thus, the processing unit may further determine the direction of the object according to the following equations: $f(x)=(V_{LPD}-V_{RPD})/(V_{LPD}+V_{RPD})$, $f(y)=(V_{UPD}-V_{DPD})/(V_{UPD}\ V_{DPD})$, $f(a)=(V_{ULPD}-V_{DRPD})/(V_{ULPD}+V_{DRPD})$ and $f(b)=(V_{URPD}-V_{DLPD})/(V_{URPD}+V_{DLPD})$, and all equations will be adapted and calculated in a linear correlation, so as to determine the direction of the motions of the object. In this case, when a specific kind of condition is met, the direction of gesture is determined and reported as which direction by the processing unit. It is worthy to note that the embodiments describing the structural arrangement of the gesture sensor 202 are only examples, without limiting thereto. It is further worthy to note that, the motion of the object detecting by this embodiment may be determined by using the same concept as mentioned in the aforementioned third and fourth embodiments. That is to say, the differential signal levels determine the motion direction, and thus will not be describe again for conciseness.

Figure 15:
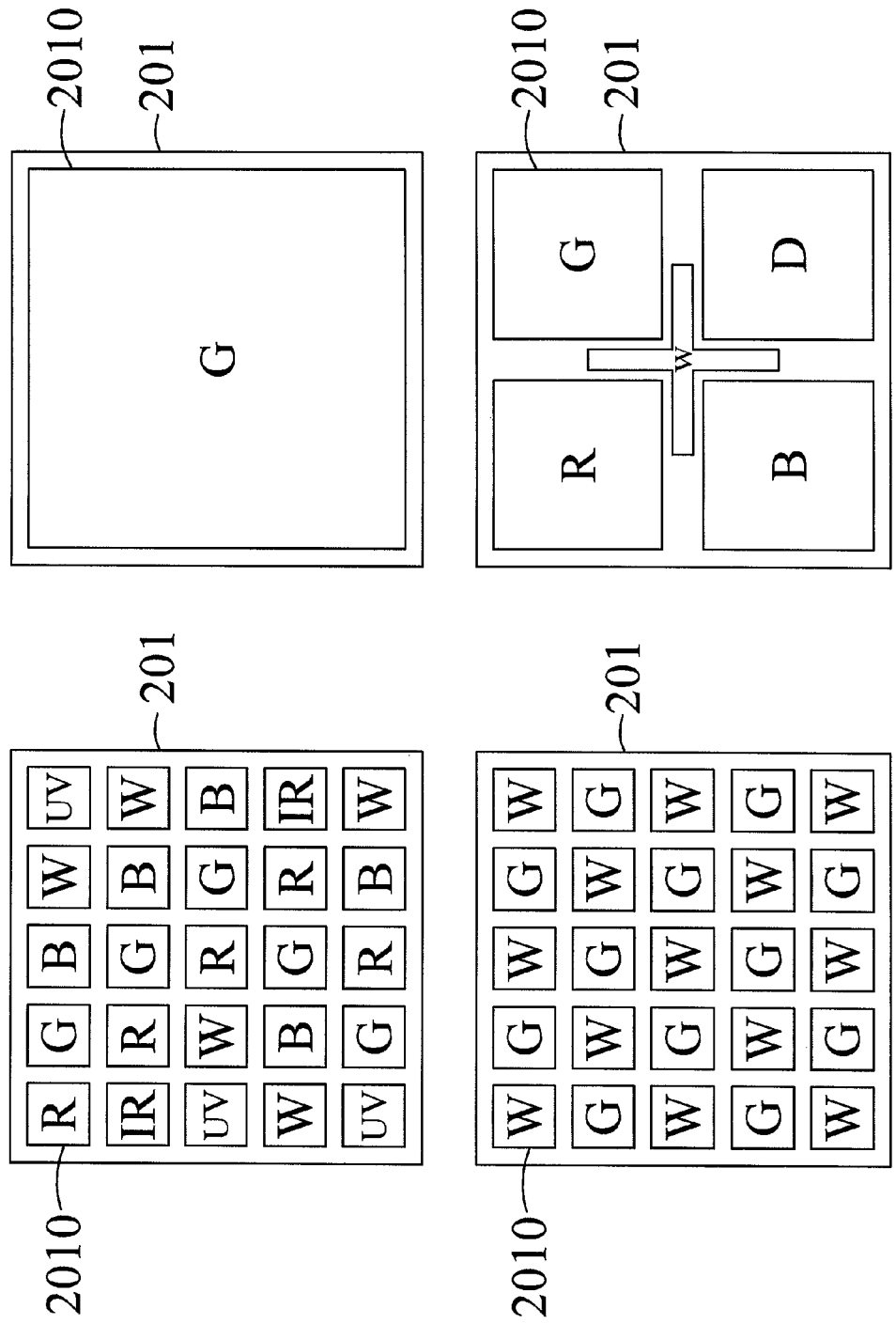
FIG. 15 is a schematic view illustrating an embodiment of different structures of light sensor in the sensing unit of the optical sensor system according to the present invention.

Please refer to FIG. 15 which is a schematic view illustrating an embodiment of different structures of light sensor in the sensing unit of the optical sensor system according to the present invention. As shown in the figure, the light sensor 201 may be a single light sensor or a mosaic tile sensor array. In one embodiment of the light sensor 201, the mosaic tile sensor array of the light sensor 201 may include light sensor cells 2010 sensing UV, RGB and IR light. In other embodiment of the light sensor 201, the mosaic tile sensor array of the light sensor 201 may include light sensor cells 2010 sensing ambient light, such as Green (G) and White (W). In other embodiment of the light sensor 201, the mosaic tile sensor array of the light sensor 201 may include light sensor cells 2010 sensing only the green light (G), such as an ambient light. In other embodiment of the light sensor 201, the mosaic tile sensor array of the light sensor 201 may include light sensor cells 2010 sensing RGB, W and Dark (D). Besides, with the requirement of sensing ability adapted to different kinds of light, the composition of the light sensor 201 would be modified by the one skilled in the art, and the embodiments describing the structural arrangement of the light sensor 201 are only examples, without limiting thereto.

Figure 16:
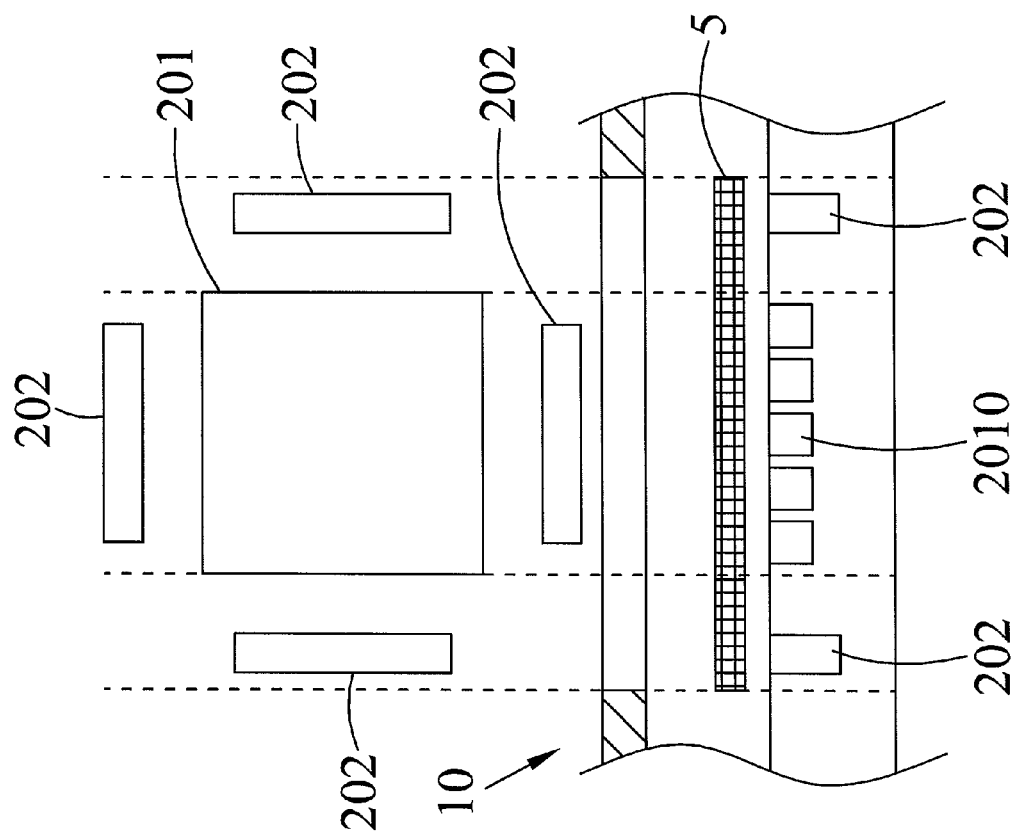
FIG. 16 is a schematic view illustrating an embodiment of adding a multi-cavity optical filter onto the sensing unit of the optical sensor system according to the present invention.

Please refer to FIG. 16 which is a schematic view illustrating an embodiment of adding a multi-cavity optical filter onto the sensing unit of the optical sensor system according to the present invention. As shown in the figure, the sensing unit 20 may further include a multi-cavity optical filter 5 being stacked thereon, and the multi-cavity optical filter 5 may filter the reflected first light signals and the second light signals passing through one of the plurality of transparent areas 100. In one embodiment, the multi-cavity optical filter 5 comprises a plurality of cavities, each of the plurality of cavities covering one of a plurality of gesture sensors or one of the light sensor cells in the light sensors; wherein each of the plurality of cavities has two partially reflective layers and one interferometric layer sandwiching between the two partially reflective layers, and shares one of the two partially reflective layers with a neighboring cavity and thereby stair stacking with the neighboring cavity. The plurality of cavities are capable of blocking the light except for a wavelength spectrum that is desired to be passed, thereby effectively accomplishes excellent light blocking from unnecessary light spectra.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. An optical sensor system, comprising:
a panel comprising a plurality of transparent areas; and
a sensing unit being located at one side of the panel and sensing a plurality of first light signals reflected by an object and sensing a plurality second light signals of an ambient light, the reflected first light signals and the second light signals passing through one of the plurality of transparent areas, and the sensing unit further comprising:
a light sensor being located at the center of the sensing unit, and the light sensor sensing the second light signals; and
a plurality of gesture sensors being independent of the light sensor and surrounding the light sensor, and the gesture sensors sensing the reflected first light signals and producing gesture signals corresponding to motions of the object, wherein one of the plurality of transparent areas is arranged on top of the light sensor at the center of the sensing unit.

2. The optical sensor system as claimed in claim 1, further including a processing unit having an activate threshold (A_THD), the processing unit triggering a gesture signal calculation if the reflected first light signals sensing by the sensing unit is larger than the A_THD.

3. The optical sensor system as claimed in claim 1, wherein the plurality of gesture sensors comprises an up PD (UPD) and a down PD (DPD) being separately configured to surround the light sensor peripherally.

4. The optical sensor system as claimed in claim 3, wherein when the gesture signal calculation is triggered by a processing unit, the processing unit further determines the direction of gesture according to the following equations:

$$f(y)=(V_{UPD}-V_{DPD})/(V_{UPD}+V_{DPD});$$

wherein $V_{UPD}$ and $V_{DPD}$ are voltage signals generated by sensing the reflected first light signals by UPD and DPD respectively.

5. The optical sensor system as claimed in claim 4, wherein the processing unit further has UPD threshold (U_THD) and DPD threshold (D_THD); wherein when $f(y)<-U\_THD$ and then $f(y)>D\_THD$, the direction of gesture is determined and reported as a first longitudinal direction by the processing unit; and when $f(y)>U\_THD$ and then $f(y)<-D\_THD$, the direction of gesture is determined and reported as a second longitudinal direction by the processing unit.

6. The optical sensor system as claimed in claim 1, wherein the plurality of gesture sensors comprises a left PD (LPD) and a right PD (RPD) being separately configured to surround the light sensor peripherally.

7. The optical sensor system as claimed in claim 6, wherein when the gesture signal calculation is triggered by a processing unit, the processing unit further determines the direction of gesture according to the following equations:

$$f(x)=(V_{LPD}-V_{RPD})/(V_{LPD}+V_{RPD});$$

wherein $V_{LPD}$ and $V_{RPD}$ are voltage signals generated by sensing the reflected first light signals by LPD and RPD respectively.

8. The optical sensor system as claimed in claim 7, wherein the processing unit further has LPD threshold (L_THD) and RPD threshold (R_THD); wherein when $f(x)<-L\_THD$ and then $f(x)>R\_THD$, the direction of gesture is determined and reported as a first lateral direction by the processing unit; when $f(x)>L\_THD$ and then $f(x)<-R\_THD$, the direction of gesture is determined and reported as a second lateral direction by the processing unit.

9. The optical sensor system as claimed in claim 1, wherein the first light signals are emitted from a light emitting unit located at the same side as the sensing unit of the panel.

10. The optical sensor system as claimed in claim 9, wherein the light emitting unit comprises infrared light emitting diodes (IR LEDs).

11. The optical sensor system as claimed in claim 1, wherein the reflected first light signals are non-visible light signals.

12. The optical sensor system as claimed in claim 1, wherein the light sensor is a single light sensor or a mosaic tile sensor array.

13. The optical sensor system as claimed in claim 12, wherein the mosaic tile sensor array includes a plurality of light sensor cells selected from the group consisting of red sensor cell, green sensor cell, blue sensor cell, white sensor cell, UV sensor cell and IR sensor cell.

14. The optical sensor system as claimed in claim 1, wherein the sensing unit further has a multi-cavity optical filter being stacked thereon, and the multi-cavity optical filter filters the reflected first light signals and the second light signals passing through one of the plurality of transparent areas.

* * * * *